United States Patent [19]

Asamizuya et al.

[11] Patent Number: 5,757,415
[45] Date of Patent: May 26, 1998

[54] ON-DEMAND DATA TRANSMISSION BY DIVIDING INPUT DATA INTO BLOCKS AND EACH BLOCK INTO SUB-BLOCKS SUCH THAT THE SUB-BLOCKS ARE RE-ARRANGED FOR STORAGE TO DATA STORAGE MEANS

[75] Inventors: Noboru Asamizuya; Norio Ebihara; Haruyuki Karibe; Yasumasa Kodama; Masaaki Kagawa, all of Kanagawa, Japan

[73] Assignee: Sony Corporation, Tokyo, Japan

[21] Appl. No.: 448,253

[22] Filed: May 23, 1995

[30] Foreign Application Priority Data

May 26, 1994 [JP] Japan .................................. 6-112940

[51] Int. Cl.$^6$ ........................................ H04N 7/173
[52] U.S. Cl. ........................... 348/7; 348/12; 348/13; 348/6; 455/4.2; 455/5.1
[58] Field of Search .......................... 348/7, 12, 13, 348/6; 455/2, 4.2, 4.1, 5.1, 6.1; 358/335; H04N 7/173, 7/16

[56] References Cited

U.S. PATENT DOCUMENTS

| | | | |
|---|---|---|---|
| 4,949,187 | 8/1990 | Cohen ........................... | 358/335 |
| 5,339,315 | 8/1994 | Maeda ........................... | 370/85.1 |
| 5,440,336 | 8/1995 | Buhro et al. ..................... | 348/13 |
| 5,442,390 | 8/1995 | Hooper et al. ................... | 348/7 |
| 5,506,615 | 4/1996 | Awaji ........................... | 348/7 |

OTHER PUBLICATIONS

"System Architecture for a Large Scale Video on Demand Service", p. 158, left column, line 5 –p. 160, left column, line 4; Computer Networks and ISDN Systems, vol. 22, No. 2, Sep. 1991, Amsterdam NL pp. 155–162, XP000225399.
Patent Abstracts of Japan, vol. 17, No. 337 (E–1388), Jun. 25, 1993 and JP-A-05 041 858 (Matsushita Electric Ind. Co.) "Abstract".
"A Store–And–Forward Architecture for Video–On–Demand Service", A.D. Gelman, et al.; Int. Conf. on Communications, Jun. 23, 1991, Sheraton–Denver Technological Center, USA.

*Primary Examiner*—Glenton B. Burgess
*Attorney, Agent, or Firm*—Frommer Lawrence & Haug LLP; William S. Frommer

[57] ABSTRACT

A data transmission apparatus comprising: data supplying unit for storing a plurality of types of data and simultaneously transmitting the plurality of types of data to a plurality of selected channels respectively; switching unit for outputting the plurality of types of data outputted from the data supplying unit to the selected different channels respectively; data storage unit for storing the data outputted from the selected channels after rearranging the data in a predetermined order; and data outputting unit for simultaneously outputting the data stored in the data storage unit from the plurality of channels after shifting the data by a certain amount.

13 Claims, 9 Drawing Sheets

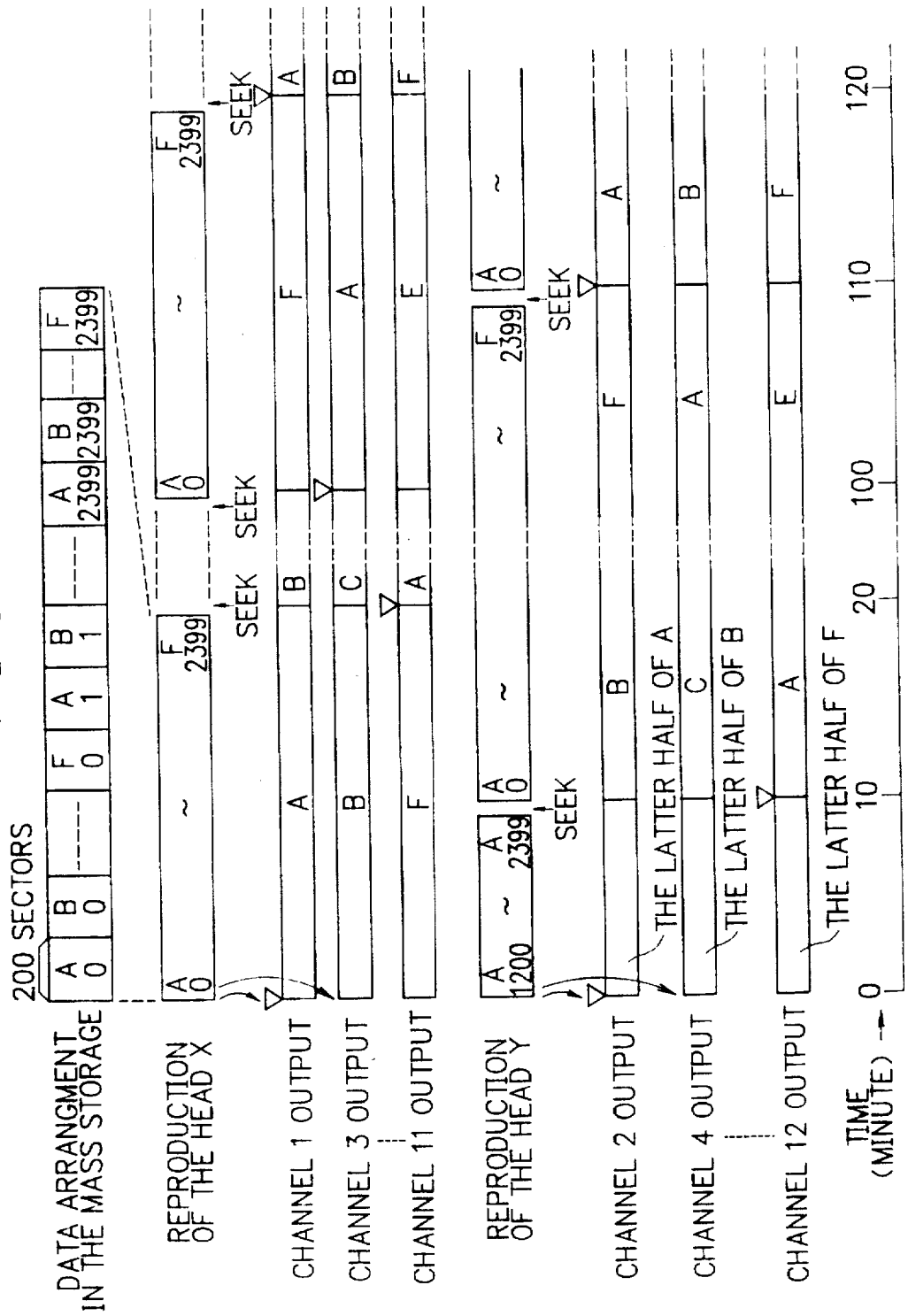

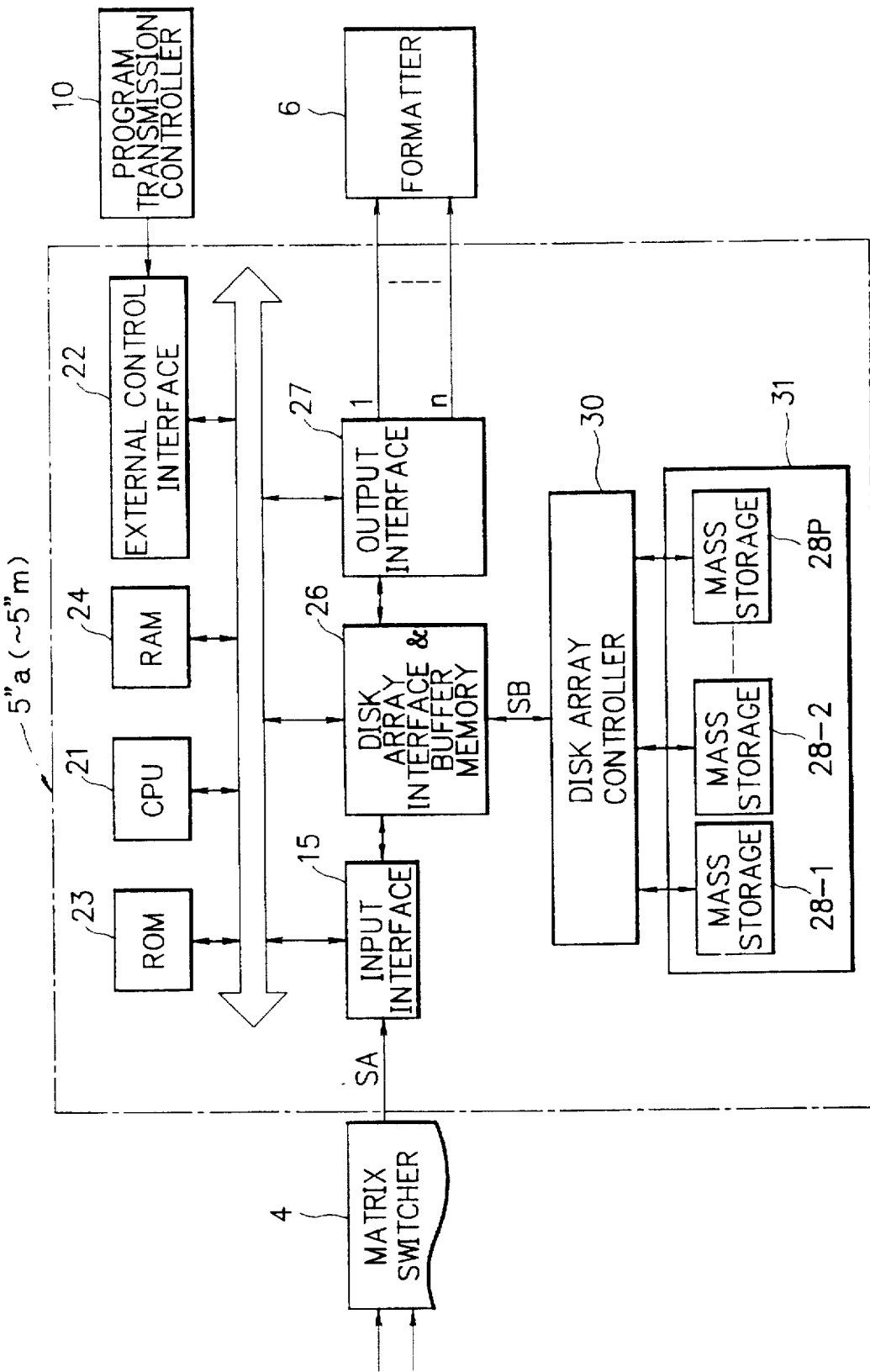

ON-DEMAND DATA TRANSMISSION BY DIVIDING INPUT DATA INTO BLOCKS AND EACH BLOCK INTO SUB-BLOCKS SUCH THAT THE SUB-BLOCKS ARE RE-ARRANGED FOR STORAGE TO DATA STORAGE MEANS

BACKGROUND OF THE INVENTION

The present invention relates to a data transmission apparatus preferably applied to a video on-demand apparatus for sending data such as image data upon demand by audience.

In the video on-demand apparatus for providing programs as requested by audience, image data including movies and other various types of data are transmitted through a plurality of channels. One of the methods for implementing the video on-demand apparatus is to provide a magnetic-tape reproducing apparatus for each of a plurality of channels and send data for all the channels simultaneously or data for each channel one after another. Alternatively, using random access of such apparatuses as a hard disk unit and an optical disk unit, random access is performed on multiple types of data recorded on a single disk to send each type of data over each channel.

However, the method in which a magnetic-tape reproducing apparatus is provided on each channel increases the number of magnetic-tape reproducing apparatus, resulting in the costly video on-demand apparatus. Additionally, in this method, a magnetic tape is reproduced repetitively, imposing a hazard of damage thereof. Further, during time in which a magnetic tape is being rewound, the data transmission service is disabled. On the other hand, the method in which a random access disk apparatus is used requires to frequently repeat random access operations to send data for multiple channels. Consequently, if there are too many channels, the access time increases accordingly providing decreased time, and requiring to decrease the number of channels.

SUMMARY OF THE INVENTION

It is therefore an object of the present invention to solve one or more of the above-mentioned problems by providing a data transmission apparatus of a relatively low cost and accommodating a relatively large number of channels.

In carrying out the invention and according to one aspect thereof, there is provided a data transmission method comprising the steps of: dividing input data of length T into N number of pieces of data providing a first major block through an N-th major block; dividing each of the first major block through N-th major block into R minor blocks composed of a first minor block through an R-th minor block; rearranging the minor blocks of the major blocks so that the first minor block of the first major block is followed by the first minor block of the second major block and so on until followed by the first minor block of the N-th major block providing a rearranged major block, the rearranged major block being followed by another rearranged major block starting with the second minor block of the first major block followed by the second minor block of the second major block and so on until followed by the second minor block of the N-th major block, this another rearranged major block being followed by still another major block with its minor blocks rearranged in the similar order, and so on until followed by the last major block starting with the R-th minor block of the first major block and ending with the R-th minor block of the N-th major block; recording the rearranged data on a recording medium; reproducing reproduction data from the recording medium; recording the reproduction data in a plurality of memories a plurality of times continuously so that the minor blocks in one of the major blocks of the reproduction data are stored in one of the memories in one storage operation; and reading the reproduction data in parallel from the plurality of memories a plurality of times continuously.

Consequently, according to the present invention, there is no need for using a plurality of reproducing units as with the conventional structure of using a magnetic tape, thus resulting in a simpler construction and a reduced cost. Additionally, there is no need for random access as with the conventional structure using a hard disk, thus resulting in a longer data read time, which in turn increases the number of channels.

The above and other objects, features and advantages of the present invention will become more apparent from the accompanying drawings, in which like reference numerals are used to identify the same or similar parts in several views.

BRIEF DISCLOSURE OF THE DRAWINGS

FIG. 8 is a schematic diagram illustrating another output data of the data transmission apparatus of FIG. 6; and FIG. 9 is a block diagram illustrating another data transmission apparatus applicable to the data transmission apparatus of FIG. 1.

DETAILED DESCRIPTION OF PREFERRED EMBODIMENTS

This invention will be described in further detail by way of a first preferred embodiment of the invention with reference to FIGS. 1 through 5 of the accompanying drawing.

Figure 1:
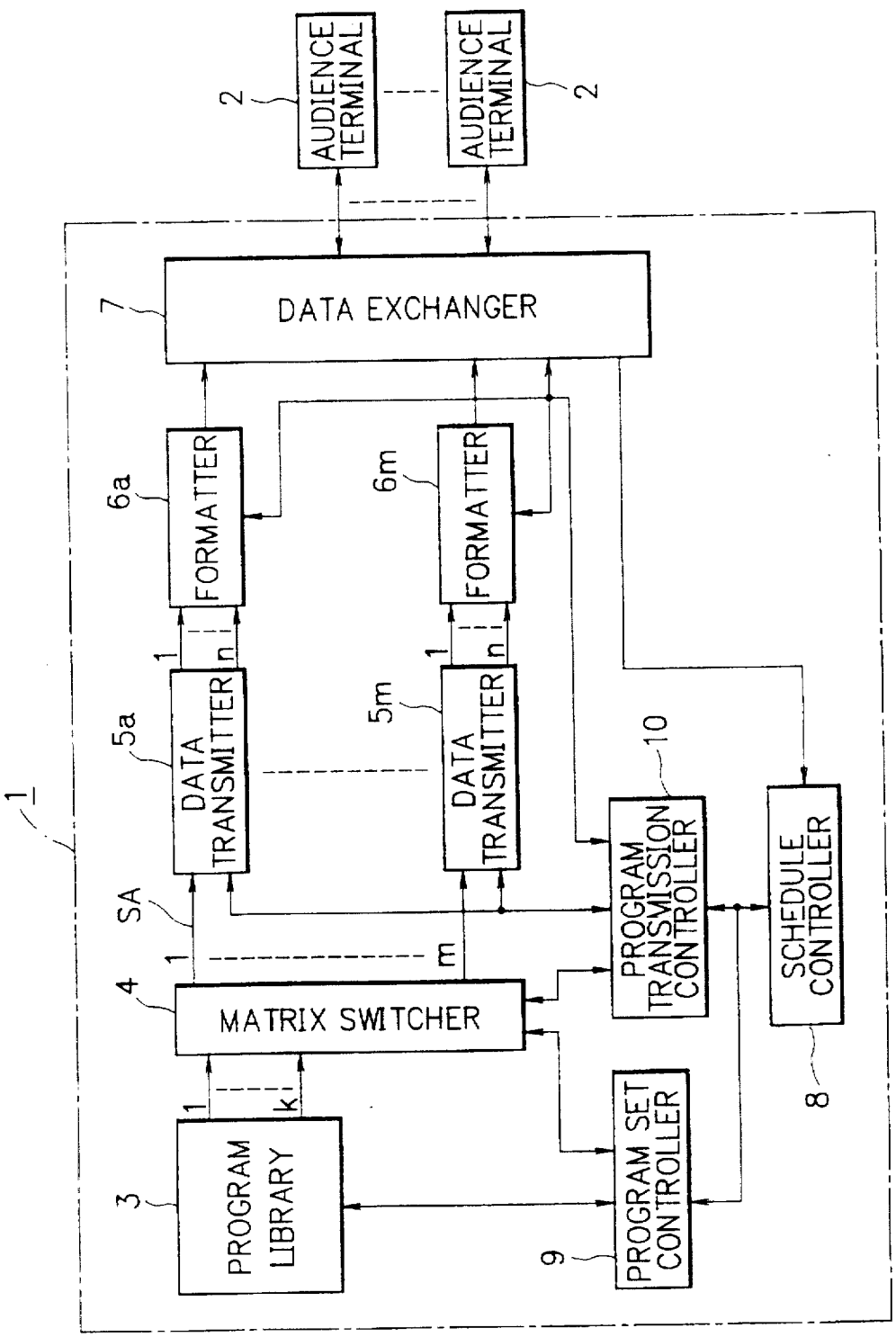
FIG. 1 is a block diagram illustrating a data transmission apparatus practiced as a first preferred embodiment of the invention.

Referring to FIG. 1, there is shown a functional block diagram of a data transmission apparatus 1 according to the present invention. Upon a demand from an audience terminal 2 for a program, the data transmission apparatus 1 selects, from a plurality of channels sending the requested program, a channel on which a program start time is nearest, and provides the selected channel to the audience terminal 2. A program library 3 of the data transmission apparatus 1 serves as a data providing means, stores all program data that can be provided to the audience terminal 2, and outputs k types of programs from k output channels simultaneously. A matrix switcher 4 is switching means for capturing the k pieces of data coming from the program library 3 and selects a given number of pieces of data to output the selected pieces of data from m selected channels respectively. Data transmitters 5a through 5m provided for the m channels respectively have n output channels (for example, n=12) each and output the same data supplied from the matrix switcher 4 to the channels simultaneously starting with the head of the data or by shifting the data by a certain amount. Formatters 6a through 6m adds an ID corresponding to the audience terminal 2 to the data coming from the channels of the data transmitters 5a through 5m and convert the data to a format of a data exchanger 7. The data exchanger 7 transfers data with the audience terminal 2.

A schedule controller 8 receives an instruction such as a program request of the audience terminal 2 from the data exchanger 7 to control each portion associated with program data transmission. A program set controller 9 controls, based on the instruction from the schedule controller 8, the program library 3 and the matrix switcher 4 to send a requested program to the data transmitters 5a through 5m. Upon receiving the instruction from the schedule controller 8, a program transmission controller 10 controls the matrix switcher 4, the data transmitters 5a through 5m, the formatters 6a through 6m, and the data exchanger 7 to send the program data to the plurality of channels.

Figure 2:
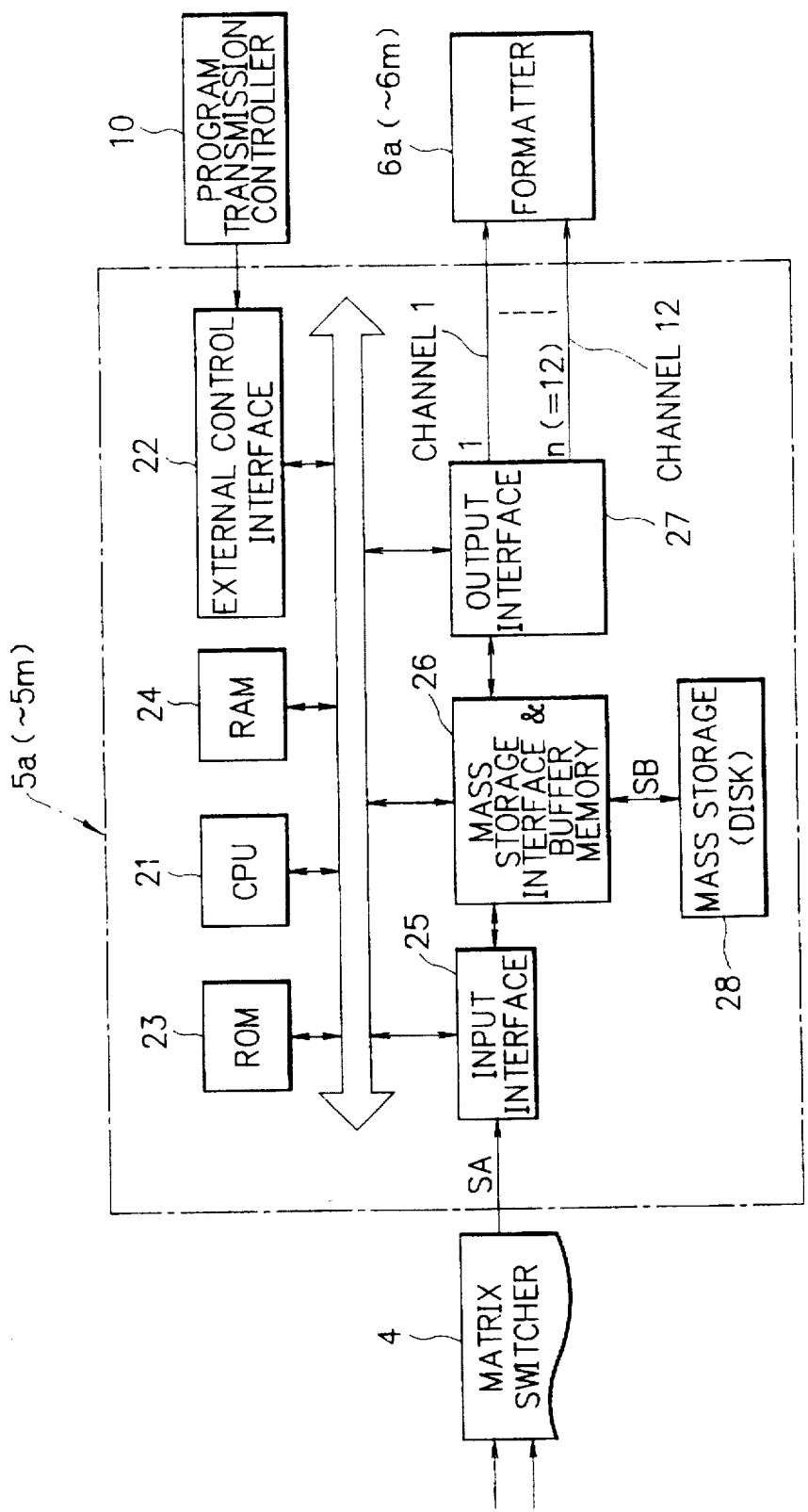
FIG. 2 is a block diagram illustrating one of data transmitters 5a through 5m of the embodiment of FIG. 1.

Referring to FIG. 2, there is shown a configuration of each of the data transmitters 5a through 5m. A CPU (Central Processing Unit) 21 in each of the data transmitters 5a through 5m receives the instruction from the program transmission controller 10 via an external control interface 22 and, based on a program stored in a ROM 23, transfers data in a RAM 24 to make an input interface 25, a mass storage interface and buffer memory 26, and an output interface 27 perform a variety of instructions. The input interface 25 receives the program data sent from the matrix switcher 4 to supply the received program data to the mass storage interface and buffer memory 26. Then, the program data is stored in the mass storage 28 that provides data storage means such as a disk recording apparatus for example. The mass storage 28 stores the program data in a manner as described below so that the program data are transmitted to the plurality of channels 1 through 12 starting with the head of the program data simultaneously or by shifting by a certain amount.

Figure 3:
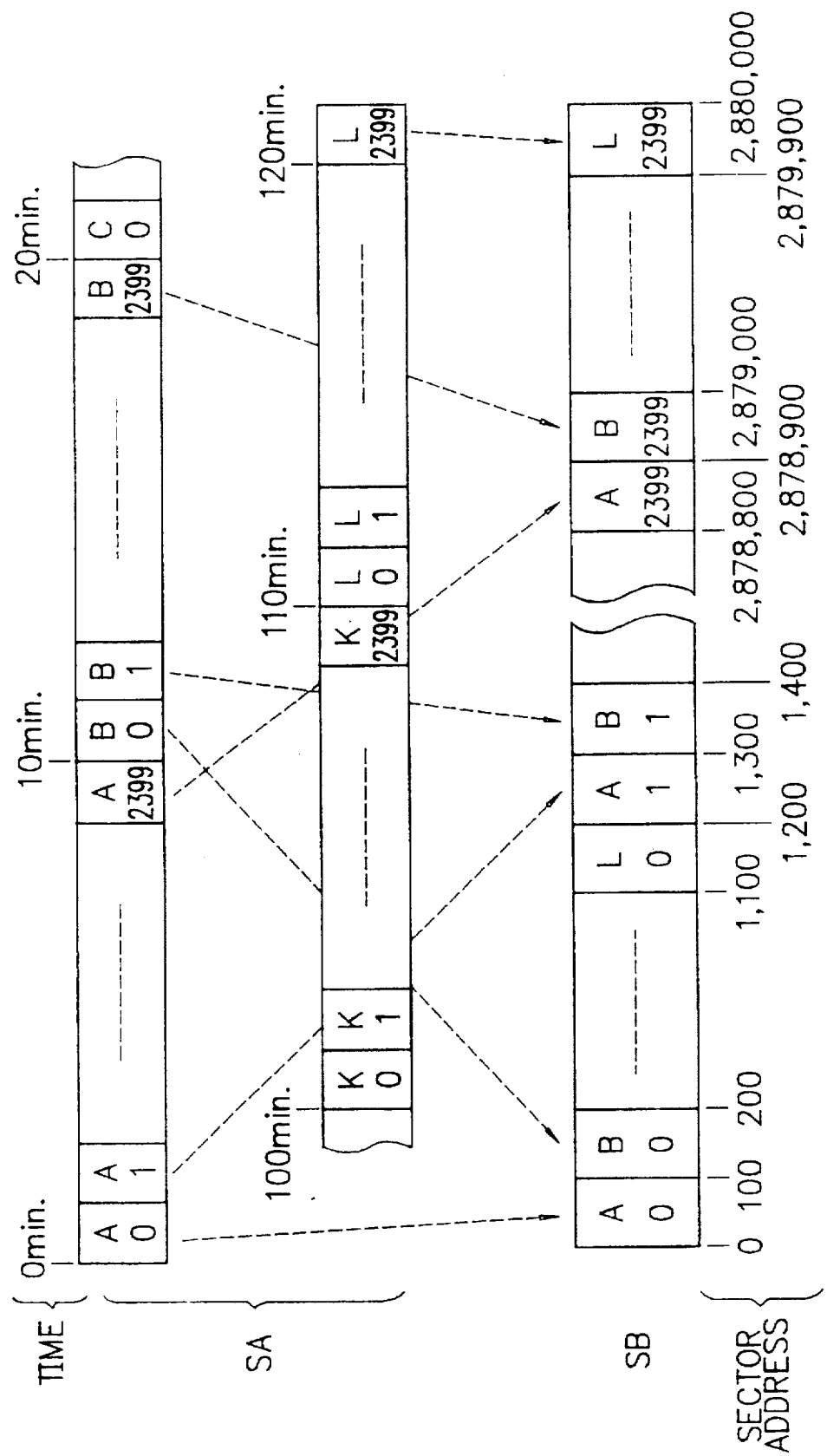
FIG. 3 is a schematic diagram illustrating data SB stored in a mass storage.

Namely, as shown in FIG. 3, the program data SA (hereinafter referred as data SA) supplied from the matrix switcher 4 are rearranged in the mass storage 28 according to a certain procedure to provide data SB. FIG. 3 shows a case in which the data SA for two hours are recorded in the mass storage 28 with a data read/write rate being 40 megabits/second, a maximum access time (a maximum seek time+a maximum rotational delay time) being 0.25 second, and a program data amount for one second being 3.2 Megabits for example. In the above-mentioned case, the maximum number of channels is obtained from the equation (1) below. Since n≦12.49 in the above-mentioned case, the maximum number of channels is 12.

$$n(D/r+ta) \leq D/d, \quad (1)$$

hence, $$n \leq \frac{D}{d \times (D/r + ta)} \quad (1)$$

where n (D/r+ta)=a time (in seconds) for reading the mass storage 28 n times;

D/d=a time (in seconds) for transmitting a program from the mass storage 28;

D=a program data amount (in Megabits);

r=the read/write rate (in Megabits/second) of the mass storage 28;

ta=the maximum access time (in seconds) of the mass storage 28; and d=the data transmission rate (Megabits/second) of the transmitter 5.

In the above-mentioned case, the same program is transmitted to the 12 channels 1 through 12 simultaneously by shifting the program data by a certain amount, so that the data SA is first divided into 12 blocks A through L as shown in FIG. 3. Consequently, each of the blocks A through L contains the data for 10 minutes. Each of the blocks A through L is divided by 2400 into 0 through 2399. A data amount of each of the divided data blocks A0, A1, ... L2399 is (3.2 megabits×60"×120')/(12×2400) =0.8 megabit. Given a minimum read/write unit of the mass storage 28 of one sector (=1 kilobyte=8 kilobits), the data amount of each of the divided data blocks A0 through L2399 is 0.8 megabits/8 kilobits=100 sectors.

Thus, the data SA divided into A0 through L2399 (12= 2400) are rearranged so that the same numbers in each of the blocks A through L are continuous in the ascending order to provide the data SB as shown in FIG. 3. Although, in the above-mentioned example, the data are rearranged when the data are stored in the mass storage 28, it will be apparent for those skilled in the art that the data stored in the program library 3 may be arranged beforehand in the same arrangement as the data SB of FIG. 3.

Figure 4:
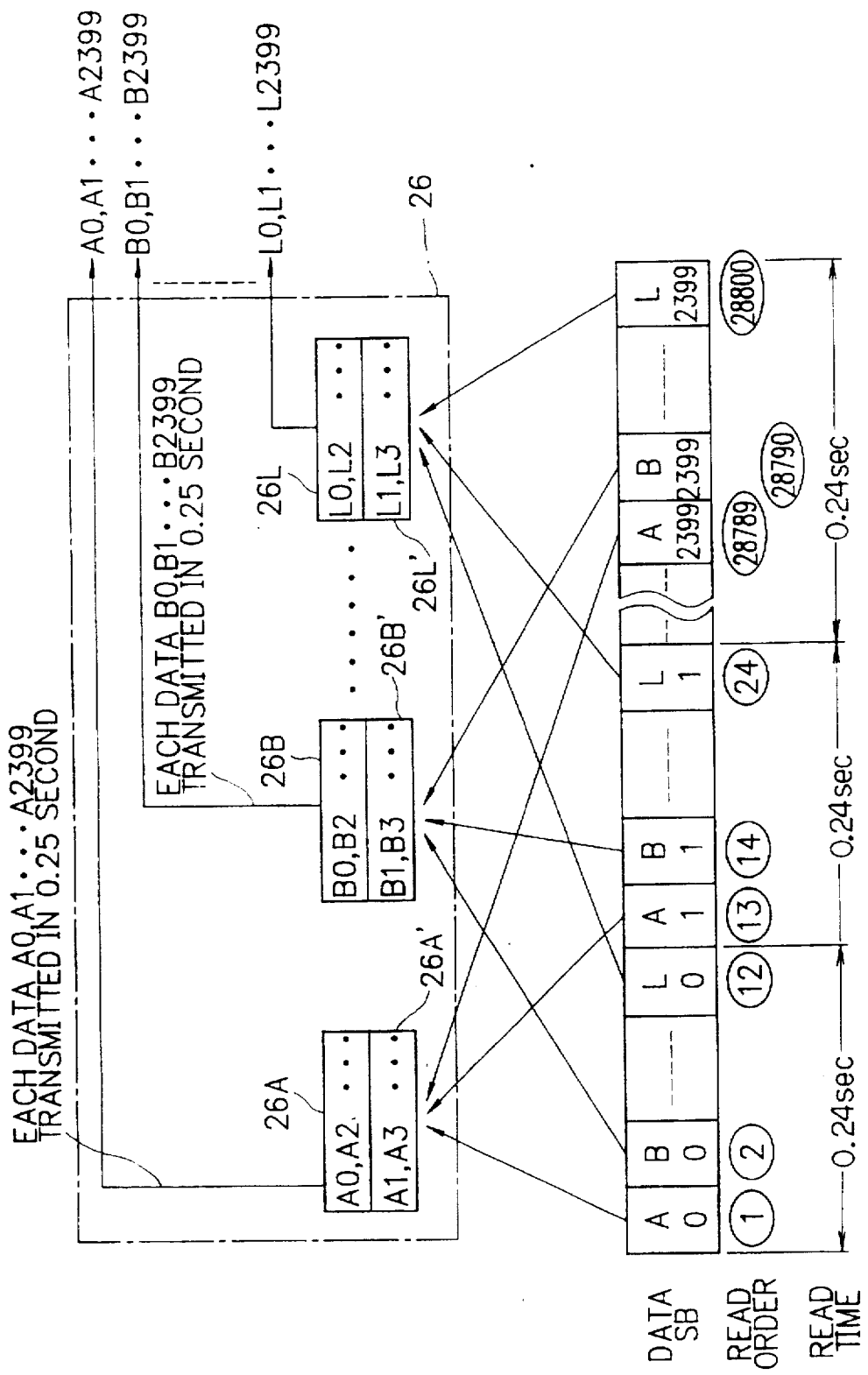
FIG. 4 is a schematic diagram illustrating a data read operation with the mass storage.

The data SB thus arranged and stored are read from the start sequentially to be sequentially stored in data output means in the mass storage interface and buffer memory 26, in this example, buffer memories 26A, 26A', 26B, 26B', . . . . . 26L, 26L', as shown in FIG. 4. The buffer memories 26A through 26L' are provided for channels 1 through 12 in the number of two. It should be noted that the number of buffer memories must be at least equal to the number of channels. The first data A0 is stored in the buffer memory 26A and the next data B0 is stored in the buffer memory 26B. Likewise, the data L0 is stored in the buffer memory 26L. Then, the 13th data A1 is read to be stored in the second buffer memory 26A' corresponding to the channel 1. Thus, the read data A0 through L2399 are sequentially stored in 24 buffer memories 26A through 26L'. The data A0 through L2399 stored in the buffer memories 26A through 26L' are read as required to be transmitted from the channels 1 through 12.

Figure 5:
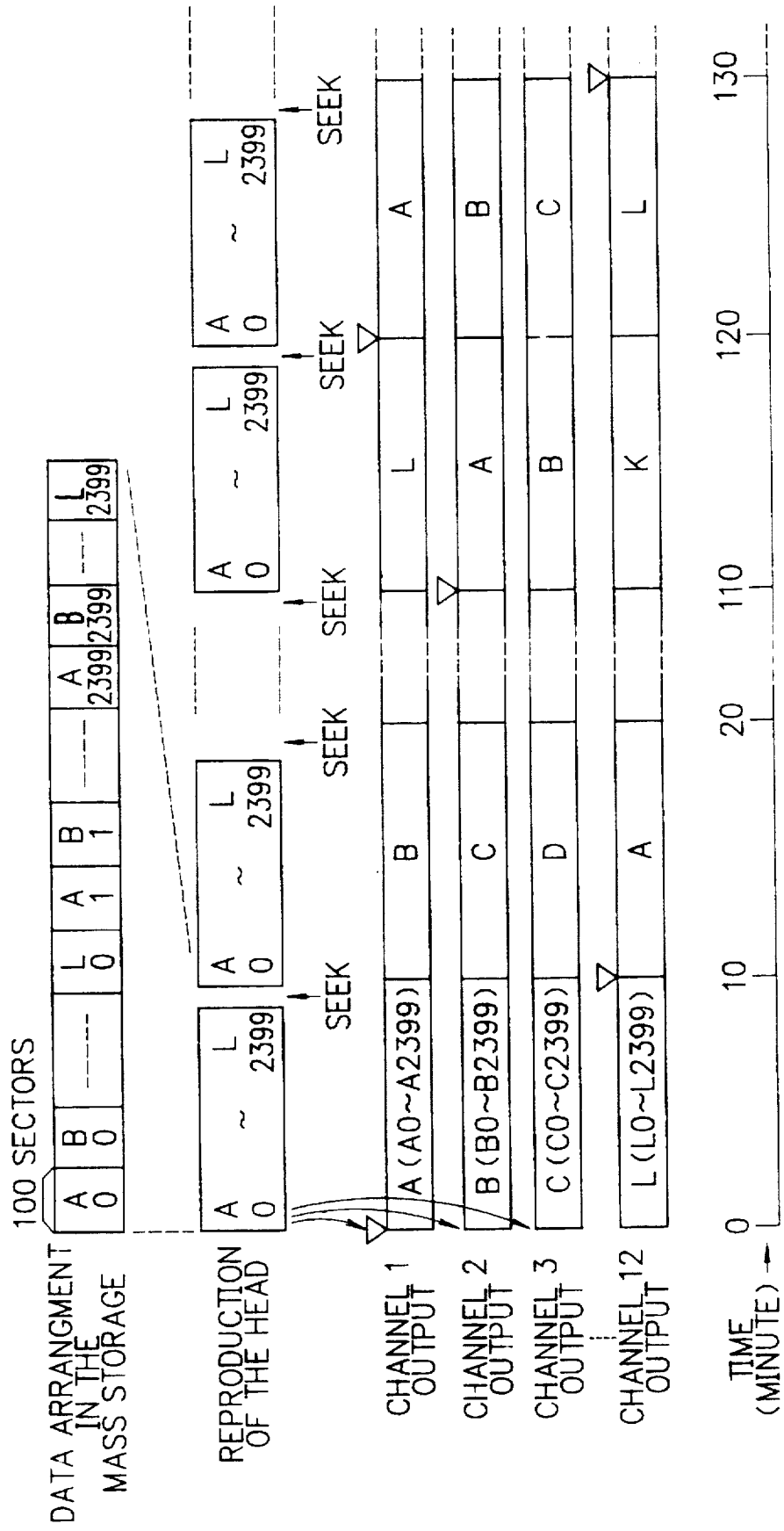
FIG. 5 is a schematic diagram illustrating output data of one of the data transmitters 5a through 5m.

At this moment, the data SB stored in the mass storage 28 are read at 40 megabits/second. Namely, the whole data SB are read in 9 minutes and 36 seconds, so that each of the data A0, B0, ... , L2399 is read in 0.02 second to be stored in the buffer memories 26A through 26L' respectively. From the buffer memories 26A through 26L', each of the data A0 through L2399 is read at a normal rate (3.2 megabits/ second). The blocks A (A0 through A2399), B (B0 through B2399), ... , L (L0 through L2399) are transmitted to the channels 1 through 12 respectively, each of the blocks shifted from the other by one block as shown in FIG. 5. Each of the blocks A through L is transmitted in 10 minutes. When the data SB in the mass storage 28 are read once, the data SB are read again at 40 megabits/second to be stored in the buffer memories 26A through 26L' from which to be transmitted at the normal rate. This time, however, the block B is stored in the first buffer memory 26A of the channel 1, the following blocks being stored in the like manner in the buffer memories 26B through 26L' respectively, shifted by one block. In the third time, the block C is stored in the first buffer memory 26A of the channel 1. In the fourth time, the block D is stored in the buffer memory 26A.

As descried above, the data stored in the mass storage 28 are read by shifting the data blocks by a certain amount in each read operation, so that the data SB in the mass storage 28 may all be transmitted over the channels 1 through 12 simultaneously or by shifting the data by a certain amount over the channels. If relatively short programs of 10 minutes each for example are recorded in the blocks A through L, 12 different programs may be transmitted from the channels 1 through 12 simultaneously. Alternatively, if a movie of 120 minutes is recorded for example, the same movie is transmitted from the channels 1 through 12 with a delay of 10 minutes, each time from the start of the movie, so that audience may always view the program from the beginning by waiting at least 10 minutes. In this case, the program transmission controller 10 controls the formatter 6a through 6m and the data exchanger 7 such that a channel having a program start time nearest an audience request time is selected for transmission.

Figure 6:
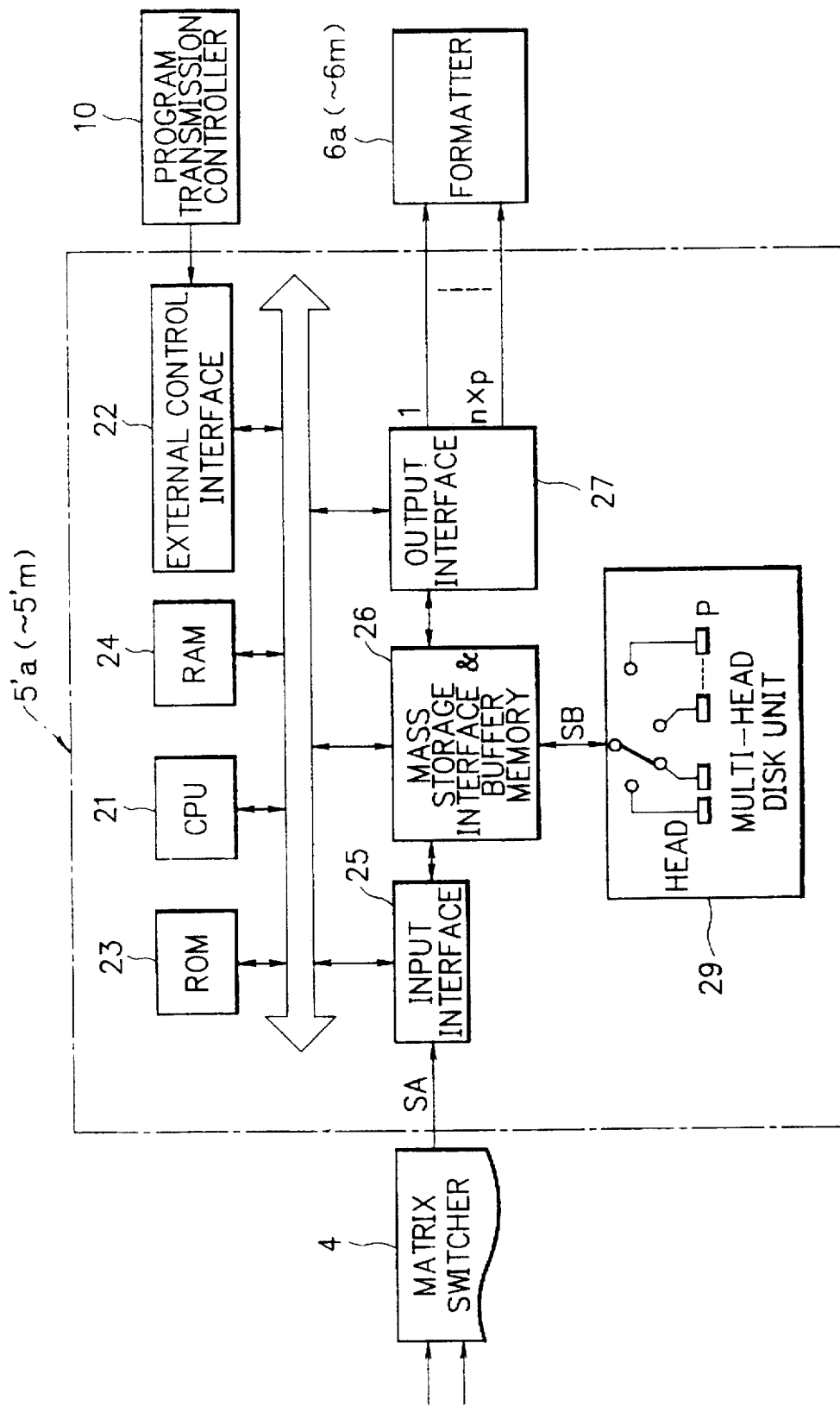
FIG. 6 is a detail block diagram illustrating a data transmission apparatus practiced as a second preferred embodiment of the invention.

In what follows, a second preferred embodiment of the present invention will be described. Referring to FIG. 6, the second preferred embodiment is generally the same as the first preferred embodiment except that each mass storage of each of data transmitters 5'a through 5'm is composed of a multi-head disk unit 29. The multi-head disk unit 29 has one recording head and p reproducing heads. Use of the multi-head disk unit having p reproducing heads allows to output the same data to the number of channels times p starting from the head of the data simultaneously via an output interface 27 by shifting the data on each channel by a certain amount. As a result, the same data may be substantially outputted from the output interface 27 on n times p channels starting from the head of the data simultaneously or by shifting the data on each channel by a certain amount.

Consequently, the data transmitters 5'a through 5'm may output a program with a time difference of 10/p minutes, while the data transmitters 5a through 5m of FIG. 2 having the mass storage 28 with only one reproducing head may output the program with a time difference of 10 minutes.

Figure 7:
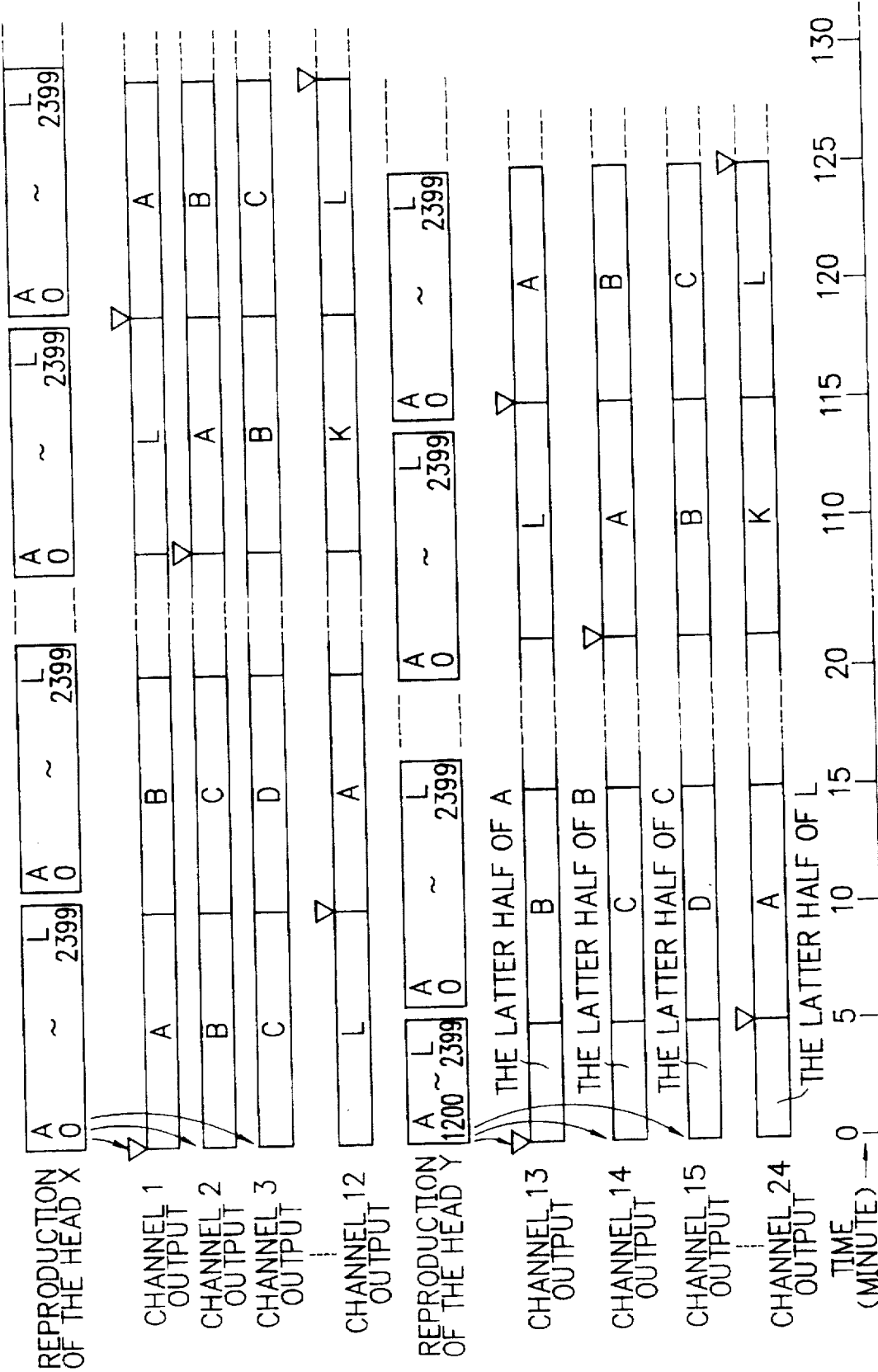
FIG. 7 is a schematic diagram illustrating output data of the data transmission apparatus of FIG. 6.

For example, referring to FIG. 7, there is illustrated an operation of the data transmitter 5'a (through 5'm) having p reproducing head, p being equal to 2. The two heads are represented by a head X and a head Y. Since the number of program transmitting channels n is 12 as mentioned earlier, the effective number of channels is 12×2=24. It should be noted that data reproduced through the head X is supplied to the channels 1 through 12 and data reproduced through the head Y is supplied to the channels 13 to 24.

In this case, the head X reads the data SB from its head, while the head Y reads the data SB at a position, with reference to the head X, ahead of one half of an amount of the data recorded on the multi-head disk unit 29. Namely, when the head X is located at the start of A0, the head Y is located at the start of A1200. This setup allows the channels 13 through 24 on the head X side to transmit a program five minutes ahead of the channels 1 through 12 respectively.

If short programs of five minutes are provided as data A0 through A1199, A1200 through A2399, B0 through B1199, ..., L1200 through L2399 respectively, 24 different programs may be transmitted simultaneously.

In the data transmitters 5a through 5m having the mass storage 28 with only one reproducing head of FIG. 2, the number of data switching times for a program of 120 minutes for example through the reproducing head is 2400 ×12=28800 and the number of seek operations from end of the mass storage back to its top is 12. If the same time difference as with the single head of FIG. 2 is allowed for the data transmitter having the multi-head disk unit 29 with p reproducing heads, the above-mentioned number of data switching times and number of seek operations are both reduced to 1/p.

For example, as shown in FIG. 8, the data on a 200 sector basis on the multi-head disk unit, namely A0, B0, ..., F0, A1, B1, ..., A2399, B2399, ..., F2399 are reproduced through the head X and the head Y with p=2, and the reproduced data are supplied to the even-number channels and the odd-number channels respectively for output with a time difference of 10 minutes. In this case, the number of times the reproducing heads are switched for a program of 120 minutes is only 2400×6=14400, and the number of seek times is only 6.

As described above, in the data transmission system 1 having the above-mentioned data transmitters 5'a through 5'm, the time difference for differential time transmission may be reduced to realize relatively fine services. If a time difference is the same as that for a single head, there is no need for recording data to the mass storage in a relatively small unit such as 100 sectors, thereby reducing the number of times data are switched during the transmission of a program of the same time as well as the number of seek times returning from the end of the mass storage to the top thereof. Consequently, the present embodiment may be applied to a storage unit having a relatively low read rate.

It will be apparent for those skilled in the art that the data transmitter associated with the present invention is not limited to the above-mentioned preferred embodiment. For example, instead of the multi-head disk unit, a disk array unit 31 of FIG. 9 may be used, the disk array unit being composed of a plurality of mass storage devices 28-1, 28-2, ..., 28-p controlled by a disk array controller 30.

Namely, referring to FIG. 9, a data transmitter 5"a to 5"m has the disk array unit 31 consisting of an array of the plurality of mass storage devices 28-1, 28-2, ..., 28-p, the disk array unit being controlled by the disk array controller 30. In this setup, if the data SB for one program is smaller than a capacity of one mass storage, a plurality of programs are stored in the mass storage devices respectively, and remaining portions in the mass storage devices are combined to store yet another program, thereby substantially eliminating a wasted space of the disk array unit 31. Further, if any one of the mass storage devices is used for parity bits, an error detected in other data may be also recovered. Additionally, the above-mentioned setup enhances the transmission rate and storage capacity of the data transmitters 5'a through 5'm, thereby increasing the number of output channels while reducing the wasted space of the disk array unit 31.

Further, in the data transmission apparatus 1, data may be stored in the mass storage 28 with redundancy and the data is read based on the redundancy for error correction, thereby enhancing system reliability.

As mentioned above and according to the invention, there is provided a data transmission apparatus comprising data supply means for storing a plurality of different types of data and sending different types of data to respective different channels simultaneously, switching means for outputting data of each channel read from a data library to another selected channel, data storage means for storing data outputted from each selected channel by rearranging the data in a predetermined array, and data output means for outputting the data stored in the data storage means from a plurality of channels simultaneously by shifting the data by a certain amount.

Consequently, according to the present invention, there is no need for using a plurality of reproducing units as with the conventional structure of using a magnetic tape, thus resulting in a simpler construction and a reduced cost. Additionally, there is no need for random access as with the conventional structure using a hard disk, thus resulting in a longer data read time, which in turn increases the number of channels.

While the preferred embodiments of the present invention have been described using specific terms, such description is for illustrative purposes only, and it is to be understood that changes and variations may be made without departing from the spirit or scope of the appended claims.

What is claimed is:

1. A data transmission method comprising the steps of:

dividing input data of length T into N number of pieces of data providing a first major block through an N-th major block;

dividing each of said first through N-th major blocks into R minor blocks composed of a first minor block through an R-th minor block;

rearranging said first through R-th minor blocks so that the first minor block of said first major block is followed by the first minor block of a second major block and so on until followed by the first minor block of the N-th major block providing a rearranged major block, said rearranged major block being followed by another rearranged major block starting with a second minor block of the first major block followed by a second minor block of the second major block and so on until followed by a second minor block of the N-th major block, said another rearranged major block being followed by still another major block with its minor blocks rearranged in the similar order, and so on until followed by the last major block starting with the R-th minor block of the first major block and ending with the R-th minor block of the N-th major block;

recording the rearranged data on a recording medium;

reproducing reproduction data from said recording medium;

storing said reproduction data in a plurality of memory units continuously so that said first through R-th minor blocks in each of said major blocks of said reproduction data are stored in each respective memory unit in one storage operation; and reading said reproduction data in parallel from each respective memory unit continuously.

2. A data transmission method as defined in claim 1, wherein said reproduction data is reproduced from said recording medium and stored in said plurality of memory units at a rate higher than a product of N times a rate at which said reproduction data is read from said plurality of memory units.

3. A data transmission method as defined in claim 1, wherein the number of said plurality of memories is at least N.

4. A data transmission method as defined in claim 1, wherein said reproduction data is stored in said plurality of memory units so that each respective memory unit for storing reproduction data of n-th (n=I to N) major block stores reproduction data of n+1 major block in a next storage operation.

5. A data transmission apparatus, comprising:

recording and reproducing means for recording and reproducing input data on a recording medium, said input data being divided into N major blocks composed of a first major block through an N-th major block, each of said major blocks being further divided into R minor blocks composed of a first minor block through an R-th minor block, the resultant data blocks being stored and reproduced on said recording medium in an order that the first minor block of said first major block is followed by the first minor block of the second major block and so on until followed by the first minor block of the N-th major block providing a rearranged major block, said rearranged major block being followed by another rearranged major block starting with a second minor block of the first major block followed by a second minor block of the second major block and so on until followed by a second minor block of the N-th major block, said another rearranged major block being followed by still another major block with its minor blocks rearranged in the similar manner, and so on until followed by the last major block starting with the R-th minor block of the first major block and ending with the R-th minor block of the N-th major block; and a plurality of memory units for storing reproduction data reproduced from said recording medium by said recording and reproducing means continuously so that said first through R-th minor blocks in each of said major blocks of said reproduction data are stored in each respective memory unit of said plurality of memory units in one storage operation, said reproduction data being read in parallel from said plurality of memory units.

6. A data transmission apparatus as defined in claim 5, wherein said reproduction data is reproduced from said recording medium and stored in said plurality of memory units at a rate higher than a product of N times a rate at which said reproduction data is read from said plurality of memory units.

7. A data transmission apparatus as defined in claim 5, wherein the number of said memory units is at least N.

8. A data transmission apparatus as defined in claim 5, wherein each respective memory unit for storing reproduction data of n-th (n=1 to N) major block stores reproduction data of n+1 major block in a next storage operation.

9. A data transmission apparatus as defined in claim 5, wherein said recording and reproducing apparatus has a plurality of P reproducing heads for reproducing said reproduction data from said recording medium at respective different locations.

10. A data transmission apparatus for supplying on-request data to a user, comprising:

supplying means for storing a plurality of types of data and supplying said plurality of types of data to each of a plurality of channels;

switching means for selectively outputting said types of data supplied from said supplying means to a plurality of channels;

a plurality of data transmitting means each having recording and reproducing means for dividing data entered from said switching means into N major blocks composed of a first major block through an N-th major block, further dividing each of said major blocks into R minor blocks composed of a first minor block through an R-th minor block, and recording on a recording medium and reproducing the resultant data blocks in an order that the first minor block of said first major block is followed by the first minor block of the second major block and so on until followed by the first minor block of the N-th major block providing a rearranged major block, said rearranged major block being followed by another rearranged major block starting with a second minor block of the first major block followed by the second minor block of a second major block and so on until followed by the second minor block of the N-th major block, said another rearranged major block being followed by still another major block with its minor blocks rearranged in the similar order, and so on until followed by the last major block starting with the R-th minor block of the first major block and ending with the R-th minor block of the N-th major block, said plurality of data transmitting means each having a plurality of memory units for continuously storing data reproduced from said recording medium by said recording and reproducing means such that the first through R-th minor blocks of each major block of the reproduced data are stored in each respective memory unit in a single storage operation, the stored data being outputted to a plurality of output channels in parallel continuously; and control means for performing control of said reproduced data such that the user-requested data is transmitted to the user from the output channels of said data transmitting means when substantially requested by the user.

11. A data transmission apparatus for reproducing data from a recording medium recorded periodically with a plurality of time-divided pieces of data of N channels, N being an integer of 2 or higher, the reproduced data of each of said N channels being distributed to said N channels for transmission as the data of said N channels, said data transmission apparatus having P reproducing heads, P being an integer of 2 or higher, said data time-shifted by reproducing positions of said P reproducing heads based on output data being transmitted via said N channels from said P reproducing heads.

12. A data transmission apparatus as defined in claim 11, wherein the plurality of pieces of data of said N channels are the same in content but shifted in time.

13. A data transmission apparatus as defined in claim 12, wherein the time shift between said N channels is T/N, T being a length of all the data.

* * * * *